United States Patent [19]

Eacobacci, Jr. et al.

[11] Patent Number: 5,775,109
[45] Date of Patent: Jul. 7, 1998

[54] ENHANCED COOLDOWN OF MULTIPLE CRYOGENIC REFRIGERATORS SUPPLIED BY A COMMON COMPRESSOR

[75] Inventors: Michael J. Eacobacci, Jr., Weymouth; Stephen J. Yamartino, Wayland; Martin L. Stein, Bedford; Robert E. Khederian, Canton, all of Mass.

[73] Assignee: Helix Technology Corporation, Mansfield, Mass.

[21] Appl. No.: 778,035

[22] Filed: Jan. 2, 1997

[51] Int. Cl.$^6$ .................................................. F25B 9/00
[52] U.S. Cl. .................................................. 62/6; 62/55.5
[58] Field of Search .................................. 62/6, 55.5

[56] References Cited

U.S. PATENT DOCUMENTS

| | | | |
|---|---|---|---|
| 4,667,477 | 5/1987 | Matsuda et al. | 62/55.5 |
| 5,010,737 | 4/1991 | Okumura | 62/55.5 |
| 5,176,004 | 1/1993 | Gaudet | 62/55.5 |
| 5,265,431 | 11/1993 | Gaudet et al. | 62/55.5 |
| 5,343,708 | 9/1994 | Gaudet et al. | 62/55.5 |
| 5,375,424 | 12/1994 | Bartlett et al. | 62/55.5 |
| 5,386,708 | 2/1995 | Kishorenath et al. | 62/55.5 |
| 5,582,017 | 12/1996 | Noji et al. | 62/55.5 |

*Primary Examiner*—Ronald C. Capossela
*Attorney, Agent, or Firm*—Hamilton, Brook, Smith & Reynolds, P.C.

[57] ABSTRACT

A method for regulating the cooldown of multiple cryogenic refrigerators supplied with compressed refrigerant from a common compressor includes the following steps. The cooldown of the refrigerators is monitored. The cooldown of at least one refrigerator is then governed to regulate the gas flow distributed from the compressor to each of the refrigerators to enhance the cooldown of an individual refrigerator. Governing a refrigerator to achieve the objectives of this method can be achieved by various processes. These processes include supplying heat to the refrigerator, slowing the speed of the displacer in the refrigerator, halting the motion of the displacer, and profiling the speed of the displacer as a function of the first and second-stage temperatures. A system for performing the above-described method includes a compressor; a plurality of refrigerators, each receiving compressed gas from the compressor; and a network terminal programmed to govern the cooldown of at least one refrigerator to accelerate the cooldown of another refrigerator.

22 Claims, 6 Drawing Sheets

ENHANCED COOLDOWN OF MULTIPLE CRYOGENIC REFRIGERATORS SUPPLIED BY A COMMON COMPRESSOR

BACKGROUND OF THE INVENTION

Currently available cryogenic vacuum pumps (cryopumps) generally follow a common design concept. A low temperature array, usually operating in the range of 4 to 25 K, is the primary pumping surface. This surface is surrounded by a higher temperature radiation shield, usually operated in the temperature range of 60 to 130 K. The radiation shield protects the lower temperature array from radiated heat. The radiation shield generally includes a housing which is closed except at an opening where a frontal array is positioned between the primary pumping surface and a work chamber to be evacuated.

During operation, high boiling point gases such as water vapor are condensed on the frontal array. Lower boiling point gases pass through that array and into the volume within the radiation shield and condense on the lower temperature array. A surface coated with an adsorbent such as charcoal or a molecular sieve operating at or below the temperature of the colder array may also be provided in this volume to remove the very low boiling point gases such as hydrogen. With the gases thus condensed and/or adsorbed onto the pumping surfaces, a vacuum is created in the work chamber.

In systems cooled by closed-cycle cryocoolers, the cooler is typically a two-stage refrigerator having a cold finger which extends through the rear or side of the radiation shield. High pressure helium refrigerant is generally delivered to the refrigerator through high pressure lines from a compressor assembly. Electrical power to a displacer drive motor in the cooler is usually also delivered through the compressor or a controller assembly.

The radiation shield is connected to a heat sink, or heat station, at the coldest end of the first stage of the refrigerator. The shield surrounds the second-stage cryopanel in such a way as to protect it from radiant heat. The frontal array is cooled by the first-stage heat sink through its attachment to the radiation shield or, as disclosed in U.S. Pat. No. 4,356,701, through thermal struts.

The coldest end of the second, coldest stage of the cryocooler is at the tip of the cold finger. The primary pumping surface, or cryopanel, is connected to a heat sink at this coldest end of the second stage. This cryopanel may be a simple metal plate or cup, or it may be an array of metal baffles arranged around and connected to the second-stage heat sink. This second-stage cryopanel also supports the low temperature adsorbent.

In many applications, such as in a cluster tool with multiple vacuum chambers, multiple cryopumps and/or single-stage hcryogenic waterpumps (hereafter, jointly referred to as "cryopumps" or "pumps") rely upon a common compressor for their supply of compressed helium gas. Alternatively, a group of helium compressors are sometimes manifolded together to act as a single source of refrigerant to multiple cryopumps. Hereafter, configurations with multiple compressors manifolded together in the preceding manner are included when reference is made to a "common compressor." The use of a common compressor to supply multiple cryopumps is often more cost efficient than a one-to-one linkage of multiple pumps to multiple compressors. As long as the output of compressed helium gas from the compressor is sufficient to allow each pump to receive the flow of compressed helium necessary to meet each pump's performance rating, the arrangement generally proves satisfactory.

DISCLOSURE OF THE INVENTION

Many situations exist, however, in which a particular pump within a plurality of cryopumps fed by a common compressor is starved of compressed helium. As a result, cooling of the starved pump can be greatly prolonged. Pump starvation often occurs when the cooling of commonly-supplied cryopumps is not synchronized. Non-synchronized cooling can occur in a variety of situations. For example, when multiple vacuum chambers within a cluster tool are concurrently operated, the pumps are often independently warmed either to liberate gases condensed thereupon or to perform system maintenance. As a result, one or more of the pumps may be warmed while others remain at their optimal cold operating temperatures. Further, the employment of cryopumps with mixed refrigeration capacity and/or thermal mass or the existence of different operating conditions in the environment surrounding each cryopump also often produces different rates of cooling for each pump. Accordingly, certain pumps may cool more quickly and reach low temperatures while others remain much warmer.

The relationship between temperature and cryopump cooling rates is discussed more thoroughly below. In short, however, the higher density of lower temperature gas will allow a colder cryopump to process more helium per stroke than a warmer cryopump can process. Because a common compressor can provide only a limited supply of helium to a plurality of cryopumps, the colder pumps will often draw a disproportionate share of the helium. As the helium supply to the warmer pump decreases, its rate of cooling slows. As a result, the warmer pump is often starved of the helium necessary to expeditiously cool to the targeted temperature.

The present invention relates to a method and apparatus for enhancing the cooldown of individual refrigerators within a system of multiple cryogenic refrigerators supplied by a common compressor. The method includes monitoring the cooldown of the refrigerators. The cooldown of at least one refrigerator is then governed to distribute gas flow from the compressor to the refrigerators so as to enhance the cooldown of individual refrigerators.

Governing a refrigerator to achieve the objectives of this method can be achieved by various processes. These processes include supplying heat to the refrigerator, slowing the speed of the displacer in the refrigerator, intermittently halting the motion of the displacer, and profiling the reciprocating rate of the displacer as a function of the first and second-stage temperatures. Each of these processes promotes the supply of adequate gas flow to refrigerators that are lagging in the cooling process, thereby enhancing their cooldown.

This invention supplies many advantages. For example, the disclosed method provides more rapid cooldown of multiple cryopumps supplied by a common compressor. Additionally, the disclosed method improves the efficiency of the cooldown process by redistributing compressed gas to those cryopumps that most need it to achieve optimal cooling rather than wasting it upon cryopumps pushing below the targeted operating temperature.

BRIEF DESCRIPTION OF THE DRAWINGS

The foregoing and other objects, features and advantages of the invention will be apparent from the following, more particular description of preferred embodiments of the invention, as illustrated in the accompanying drawings in which like reference characters refer to the same parts throughout the different views. The drawings are not necessarily drawn to scale, emphasis instead being placed upon illustrating the principles of the invention.

DETAILED DESCRIPTION OF THE PREFERRED INVENTION

In the refrigerator of a typical cryopump, the working fluid is compressed; the heat of compression is removed by air-cooled heat exchangers; the fluid is further cooled in a regenerative heat exchange matrix; and the gas is then expanded to produce cooling below the ambient temperature. A cryopump must operate effectively at less than 20 K to remove gas molecules from a working chamber. Achieving this low temperature requires the use of highly efficient heat exchangers and a working fluid (for example, helium gas) that remains fluid at temperatures approaching absolute zero.

The flow of compressed-gas refrigerant in the cryogenic refrigerator of a cryopump is cyclic. In the most basic form of a cryogenic refrigerator, a source of compressed gas, i.e., a compressor, is connected to a first end of a cylinder through an inlet valve. An exhaust valve in an exhaust line leads from the first end to the low-pressure inlet of the compressor. With a displacer including a regenerator at a second end of the cylinder, and with the exhaust valve closed and the inlet valve open, the cylinder fills with compressed gas. With the inlet valve still open, the displacer moves to the first end to force compressed gas through the regenerator to the second end, the gas being cooled as it passes through the regenerator. When the inlet valve is closed and the exhaust valve is opened, the gas expands into the low-pressure discharge line and cools further. The resulting temperature gradient across the cylinder wall at the second end causes heat to flow from the load into the gas within the cylinder. With the exhaust valve opened and the inlet valve closed, the displacer is then moved to the second end, displacing gas back through the regenerator which returns heat to the cold gas, thus cooling the regenerator, and the cycle is completed.

To produce the low temperatures required for cryopump uses, the incoming gas must be cooled before expansion. The regenerator extracts heat from the incoming gas, stores it, and then releases it to the exhaust stream. A regenerator is a reversing-flow heat exchanger through which the helium passes alternately in either direction. The regenerator comprises a material of high surface area, high specific heat, and low thermal conductivity. Thus, the regenerator will accept heat from the helium if the helium's temperature is higher. If the helium's temperature is lower, the regenerator will release heat to the helium.

Figure 1:
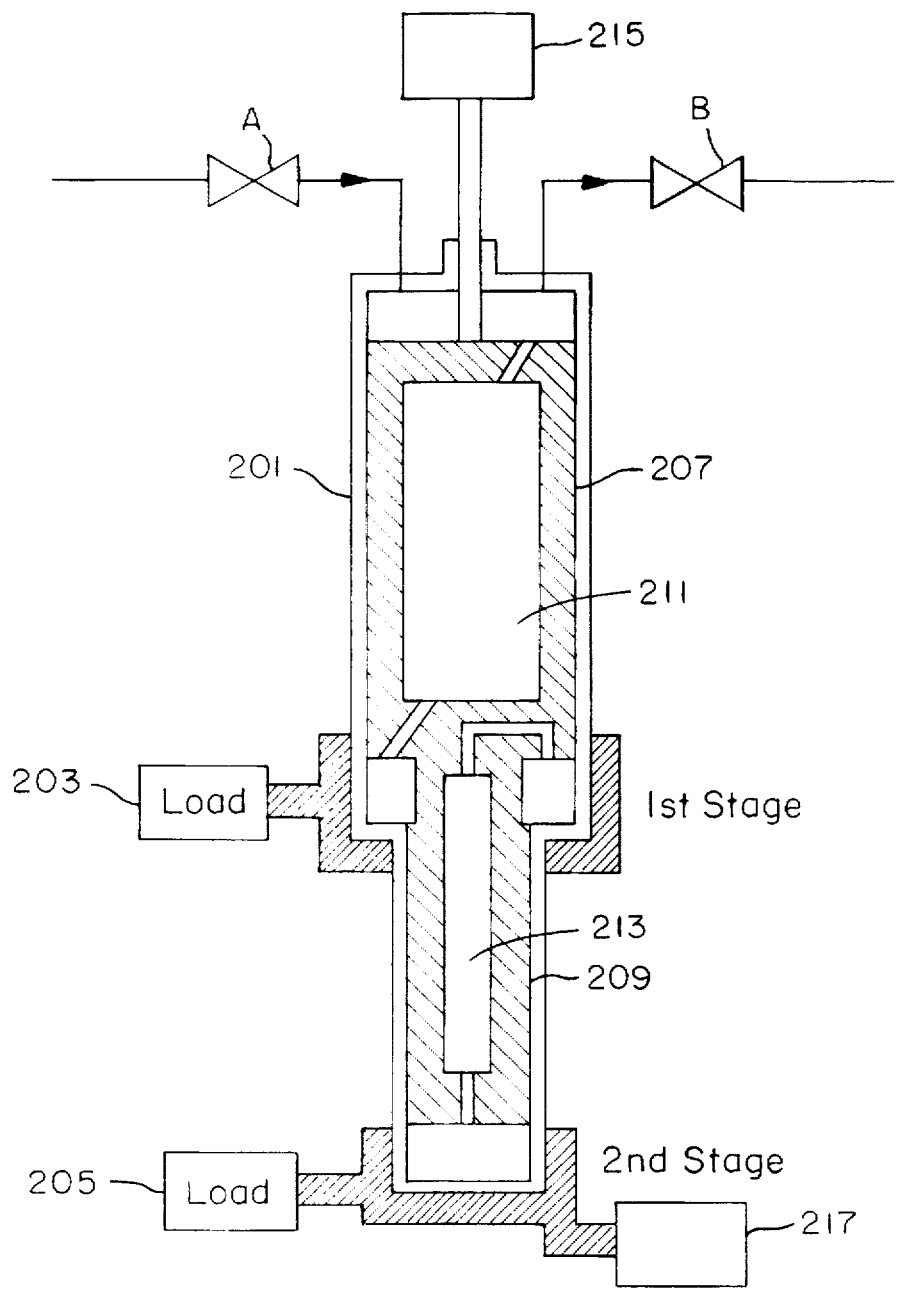
FIG. 1 is a schematic illustration of a conventional closed-cycle cryogenic refrigerator of a cryopump.

Further, a second stage of refrigeration can be added, as shown in FIG. 1, to achieve temperatures below 10 K. In the device of FIG. 1, helium enters the refrigerator through valve A and exits through. A displacer drive motor 215 drives displacers 207 and 209 in the first stage and second stage, respectively. The first stage displacer 207 includes a first regenerator 211, and the second stage displacer 209 includes a second regenerator 213. Heat is extracted from first-stage thermal load 203 and second-stage load 205. A heating element 217 is provided in contact with the second stage to warm the second stage.

Figure 2:
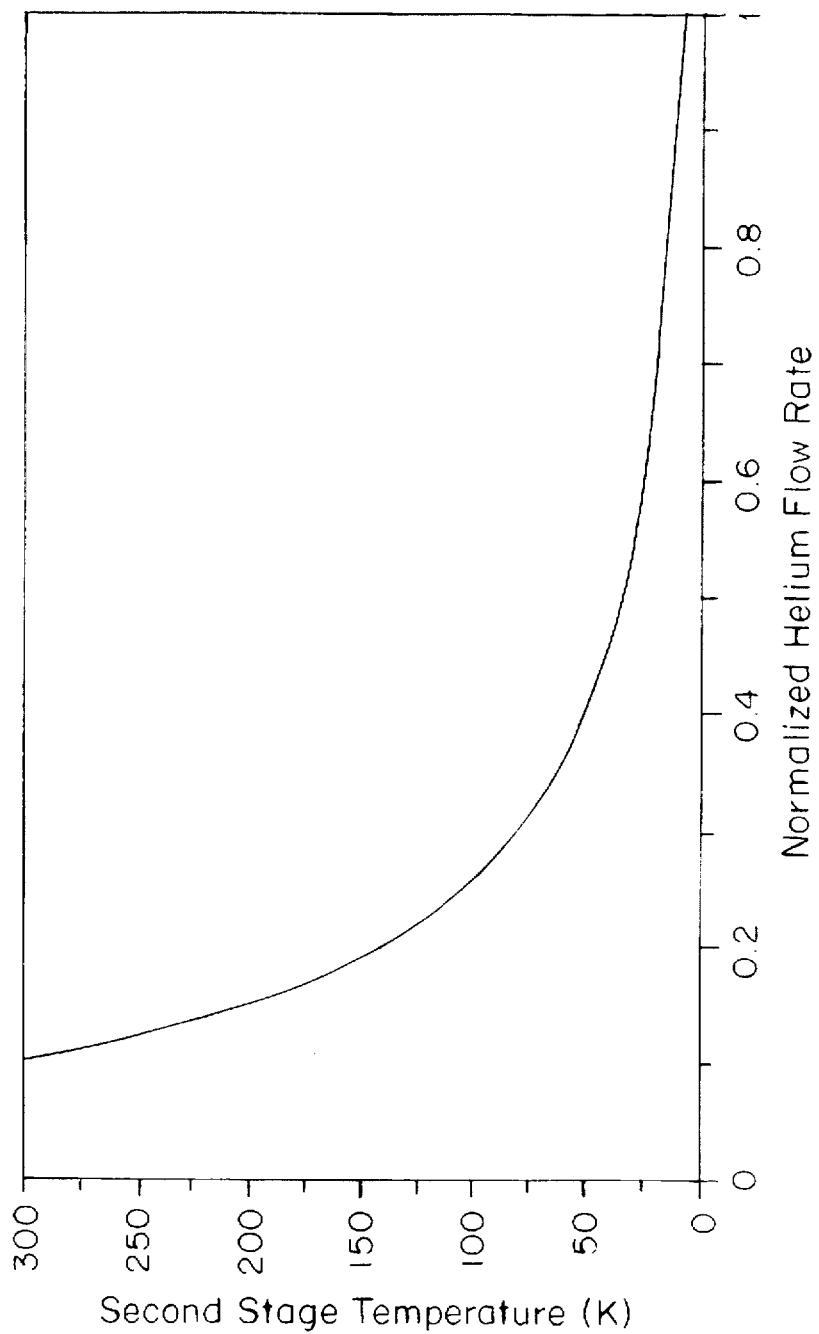
FIG. 2 is a graph illustrating the relationship between the temperature of the second stage and the normalized helium flow rate during cooldown.

FIG. 2 illustrates the normalized flow rate of helium gas as a function of the temperature of the second stage of a CTI-Cryogenics 350 model cryogenic refrigerator during cooldown. As plotted, the "normalized flow rate" is the ratio of the flow of compressed gas that a refrigerator can process at a given temperature to the flow of compressed gas that the refrigerator can process at approximately 10 K. As can be seen in the chart, a refrigerator with a second stage temperature of 25 K can process a normalized flow rate of approximately 0.6. Meanwhile, that same refrigerator, when warmed to 300 K, can process no more than a normalized flow rate of just over 0.1, more than a five-fold decrease in helium processing capacity.

Each refrigerator is typically provided with a rated performance value that reflects the amount of compressed gas that it must process to operate at a guaranteed level of performance. For example, many refrigerators are provided a rated performance calculated at a 17 standard cubic feet per minute (scfm) helium supply. Accordingly, these refrigerators can meet their rated performance if supplied, individually, by a compressor producing 17 scfm. As illustrated by FIG. 2, however, the amount of gas flow that a refrigerator can process is inversely related to temperature. Therefore, the maximum supply of compressed gas that the refrigerator can process may be much less than 17 scfm at room temperature, yet the refrigerator may be able to process up to approximately 25 scfm when cooled below 20 K. If adequate gas flow is provided, the amount of helium processed by the refrigerator will vary accordingly.

As a result of this attribute, compressed helium is often distributed inefficiently where a single compressor supplies multiple refrigerators. As shown by the preferred embodiment illustrated in FIG. 3, a plurality of refrigerators 110 may all receive compressed helium from a single compressor 112 through a manifold 114. A network terminal 116 is electronically coupled through a control line 118 with each of the refrigerators 110. The network terminal 116 is thereby capable of measuring the temperature of each of the refrigerators 110 and determining whether any of the refrigerators 110 have a temperature below a triggering limit. If so, the network terminal 116 can govern the temperature of a first refrigerator 120, where the first refrigerator 120 is colder than the triggering limit, to provide a greater supply of compressed helium to a second refrigerator 122 (usually a warmer one) to increase the rate at which the second refrigerator 122 cools. The network terminal 116 may likewise govern the other refrigerators within the plurality 110 to increase or decrease the supply of helium that they process depending upon whether they possess a temperature above or below the triggering point.

Figure 3:
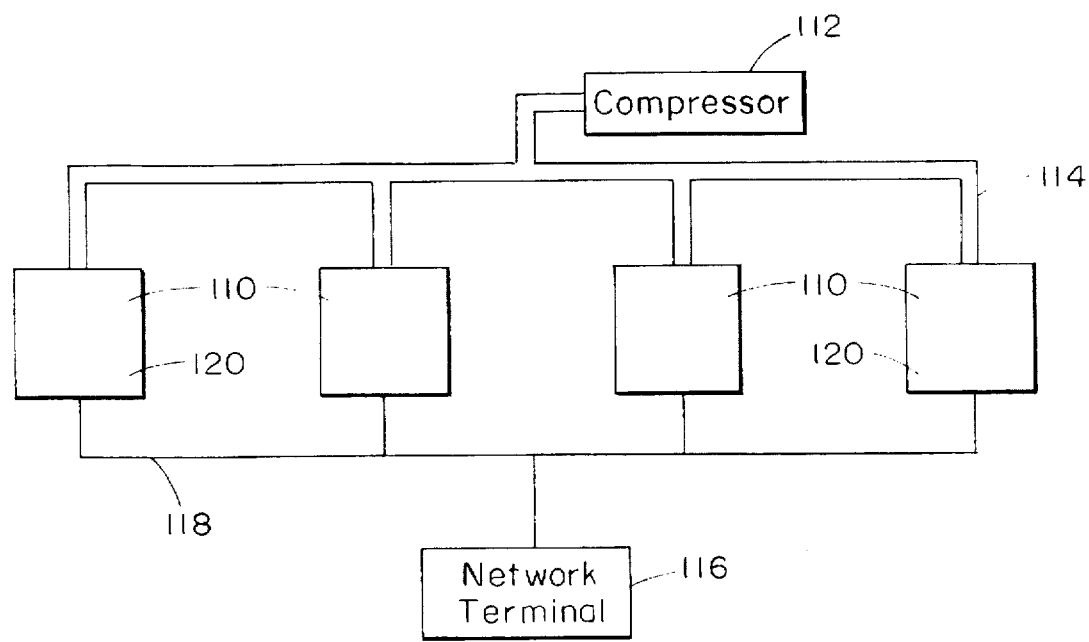
FIG. 3 is a schematic diagram of a system in which a plurality of cryogenic refrigerators is supplied by a common compressor.

The inefficiency in helium distribution that this invention remedies can be attributed directly to the relationship between refrigerator temperature and helium processing capacity. While the refrigerator's capacity to process compressed helium rises with decreasing temperature, the flow rate that the compressor is able to produce is essentially fixed. Where multiple refrigerators are supplied by a common compressor, as shown in FIG. 3, the aggregate gas flow that the refrigerators are capable of processing will often exceed the fixed supply of the compressor when the refrigerators have cooled to sufficiently-low temperatures. When the refrigerators are warm, the compressor will typically supply more compressed gas than the refrigerators are aggregately capable of processing. Excess compressed helium is diverted from processing through an internal bypass valve. As the refrigerators cool below a given limit (often at approximately 80 K), the bypass valve is closed and the refrigerators begin to contest for a now-scarce supply of compressed gas. Typically, each refrigerator will receive a prorated portion of the gas supply which can be calculated as that refrigerator's maximum consumption (at the given temperature) multiplied by the ratio of the available supply over the present aggregate maximum consumption of all refrigerators. The aggregate cooldown of all refrigerators can thereby be greatly prolonged as aggregate cooldown is generally limited by the cooldown of the slowest (typically the warmest) refrigerator, and the warmest refrigerator is restricted to a mere portion of its already limited processing capacity.

The following example is designed to further illustrate the above-described phenomenon. A CTI-Cryogenics 9600 model compressor can provide 51 standard cubic feet per minute (scfm) of compressed helium gas. If three sufficiently-cold 350 model refrigerators at equal temperature are all supplied by this compressor, each will receive approximately one-third of this supply, 17 scfm of helium (just enough to achieve its rated performance). If, however, two of these refrigerators are operating at 17 K, these two are capable of drawing approximately 25 scfm of helium; and, in the absence of a constraint upon helium supply, each would do so. On the other hand, assume that the third refrigerator in this example was recently vented to an outside atmosphere and is trying to cool down from a temperature of 130 K. This third refrigerator, because of its warmth and the correspondingly greater volume of the helium passing through it, may only be able to draw a maximum of 5 scfm of helium.

The compressor, however, cannot supply enough helium (maximum supply=51 scfm) to supply all three refrigerators with enough helium to meet their maximum demands (25 scfm+25 scfm+5 scfm=55 scfm), even with the minimal demand from the third refrigerator. Each refrigerator, therefore, is limited to a fraction of the helium that it would draw without the constraint upon supply. In this case, the fraction is 51/55. As can be seen in FIG. 2, the rate of increase in flow-rate demand rises dramatically, with each degree of temperature drop below 50 K, and particularly, below 25 K. Nonetheless, the desired operational temperature range (often, about 15 K) can be easily maintained with a flow rate significantly less than the amount that would ultimately be processed by the refrigerator under full-flow conditions. In fact, heating elements in contact with the second stage are often supplied to provide heat to counter "runaway" cooling when the refrigerator temperature may drop well below the 15 K target.

Often, little or no additional benefit is obtained by supplying an already-cooled refrigerator with more than the 17 scfm supply of gas needed to achieve its rated performance. Meanwhile, the warm pump cannot achieve its rated performance until it has cooled to a temperature below that at which it is capable of processing at least 17 scfm of gas.

Returning to the example provided above, the two refrigerators capable of processing 25 scfm will be supplied with approximately 23.2 scfm (the product of 25 and 51/55) due to the shortage of compressed gas. Though somewhat limited from their maximum performance capability, these refrigerators will nonetheless perform at levels exceeding their rated performance, which is calculated at 17 scfm. Meanwhile, the warmer refrigerator, having a capacity of 5 scfm, will receive only approximately 4.6 scfm (the product of 5 and 51/55), due to the constraints of the compressor. This shortfall removes the warmer refrigerator even further from its rated performance level and makes reaching that level more difficult. Accordingly, providing a maximum flow of gas to the warm pump, even at the expense of colder pumps, is typically advantageous because the warm pump is thereby allowed to cool as quickly as possible.

Figure 4:
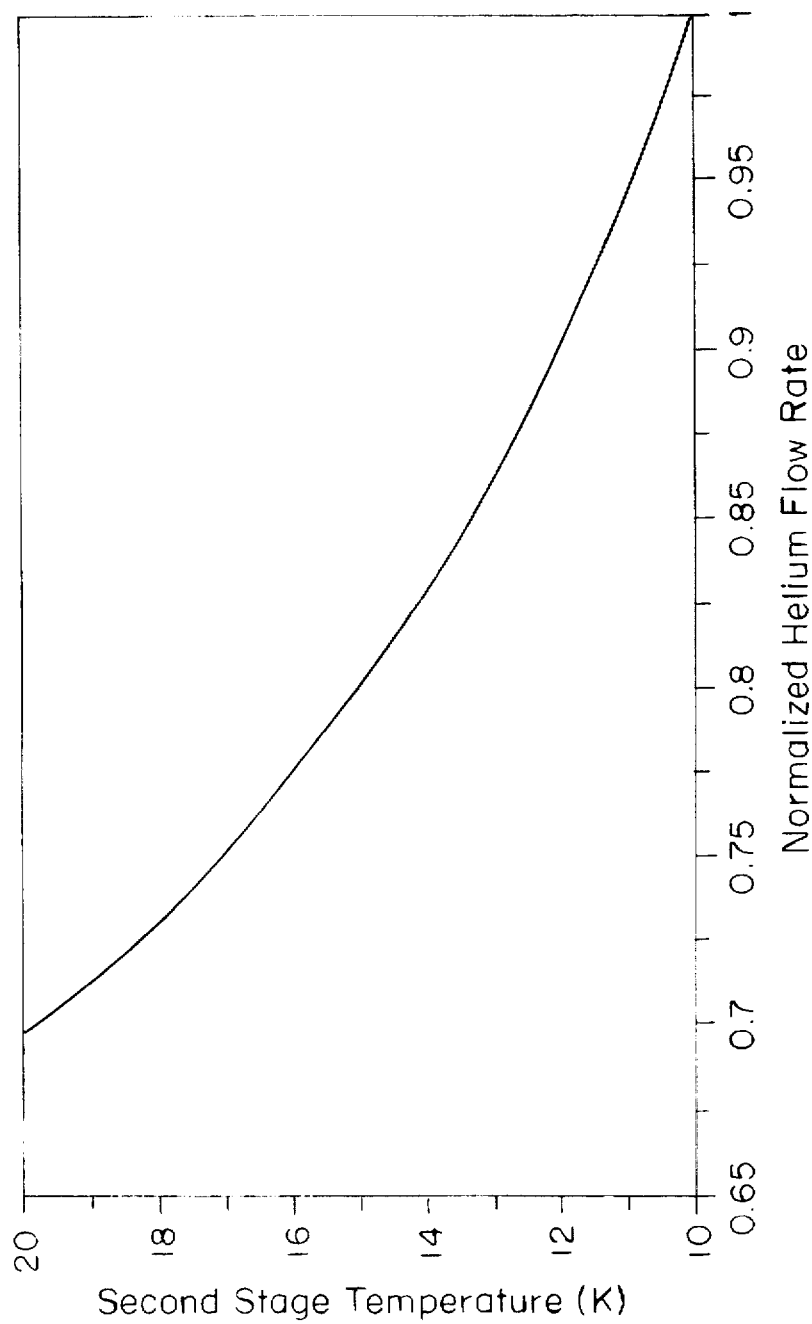
FIG. 4 is a graph illustrating a relationship between the same variables as in FIG. 1 but over a narrower temperature range during excursions in the temperature of the second stage.

Similarly, FIG. 4 illustrates the relationship between normalized helium flow rate and second stage temperature in a CTI-Cryogenics 350 model refrigerator during temperature excursions over a narrower temperature range. As shown, the rate of helium consumption by the refrigerator can increase by more than 40% as the temperature drops from 20 to 10 K. Conversely, warming an excessively-cooled refrigerator from 10 to 15 K can liberate 20% of the helium flow consumed by that refrigerator before warming.

Figure 5:
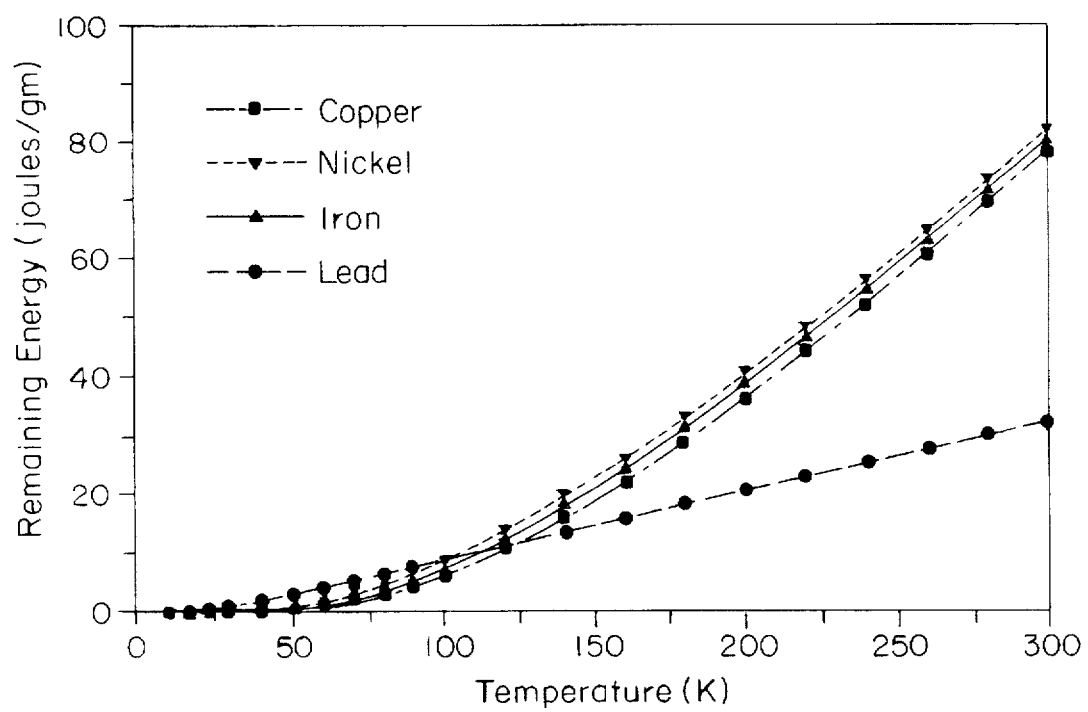
FIG. 5 is a graph of the energy contained in several of the materials commonly used to construct cryopumps plotted against temperature.

Once a refrigerator has cooled to a temperature at or near that targeted, a restricted supply of helium will usually prove sufficient to maintain the temperature or to complete cooling. Further, this process may be performed when faster-cooling two-stage pumps have reached an intermediate temperature of approximately 50 to 100 K. From this temperature, comparatively little energy is required to complete cooling, as shown in FIG. 5. FIG. 5 tracks the energy contained, over a range of temperatures, in several of the materials commonly used to construct cryopumps. As shown, the slope of the energy curve approaches zero at temperatures below 100 K, so the cooling of a pump can be halted at 80 K while requiring comparatively little time and the removal of only a comparatively small amount of energy to complete cooling from 80 K to 17 K. Therefore, if any pumps must be starved of the full flow of compressed helium that they are capable of processing, the pumps that should be starved are those that are coldest, preferably those with temperatures below 80 K, so as to achieve fastest aggregate cooldown.

Accordingly, this invention includes several methods of reducing or halting the flow of compressed helium to refrigerators with temperatures below a triggering limit. These modes of gas-flow regulation lessen or remove the risk that warmer refrigerators supplied by the same compressor will be starved of their optimal supply of compressed helium.

In a first embodiment of a method of this invention, the temperature at each of a plurality of refrigerators is monitored. Temperature can be measured by a variety of indirect means. For example, one or more of a variety of variables (such as vapor pressure) with a known relationship to temperature may be measured as a surrogate to temperature. Henceforth, all such alternate measurements are included as measurements of "temperature." A network terminal then determines whether the temperature of any cryopump is below a triggering limit. The triggering limit can be established in numerous ways, most simply by setting a fixed temperature at which regulation will commence and continue until the other refrigerators have caught up. If the controller determines that the temperature of at least one, but not all, refrigerators have dropped below the triggering limit, the network terminal employs adaptive control to halt the operation of that/those refrigerator(s). This control ceases the motion of the displacer and halts the flow of compressed helium within that/those refrigerator(s) so as to optimize the distribution of helium to warmer refrigerators. At this point, the state of refrigerator activity may be described as thermal coasting. Note also that the triggering limit for each refrigerator may differ from that of the others particularly if both one-stage and two-stage refrigerators are used.

The network terminal then continues to monitor the temperature of the halted refrigerator until it rises above a reactivation value at which time the refrigerator once again commences operation and helium flow is restored. The refrigerator may need to be reactivated to limit the sublimation of gases condensed upon the pumping surfaces as the temperature within the cryopump rises. The temperature of the refrigerator will then be cooled again to the triggering temperature where, if all other refrigerators have yet to catch up, the process will repeat. As examples, a two-stage refrigerator of a cryopump may have a triggering value of 80 K and a reactivation value of 90 K; whereas, a single stage of a waterpump may have a triggering value of 140 K and a reactivation value of 145 K. When all refrigerators are in substantial thermal equilibrium, each refrigerator is released from temperature control, and the cryopumps are allowed to cool in an optimum time in parallel.

In a second embodiment of the method of this invention, the temperature of each refrigerator is monitored as described above. When the refrigerator has cooled to a temperature below the triggering point, the temperature of the refrigerator is maintained or increased by a heating element as its operation continues. As a result, cooling ceases or reverses, and the increase in helium consumption by the coldest refrigerators is halted. Accordingly, the warmer refrigerators are afforded an increased supply of helium. If the temperature of the regulated refrigerator warms above a control limit as a result of the supplied heat, the heating element may again be shut off to prevent excessive sublimation from the pumping surfaces. As explained above, this process may also be cyclical, whereby this temperature control process is repeated until all refrigerators are in substantial thermal equilibrium. Alternatively, proportional control of the heater may be provided.

In a third embodiment of the method of this invention, the temperature of the pumps may be monitored, as above. As the temperature of a pump drops below a triggering limit, the pump is governed by slowing the reciprocating motion of its displacer. For example, an algorithm can be employed for use with a two-stage refrigerator which creates a profile for the speed of the displacers during cooling. The rate of reciprocation of the displacers of each refrigerator is set at 216 rpm upon initial cooling following the vapor release phase of a regeneration procedure. When the temperature of the first stage of a pump drops to 100 K, the algorithm slows the rate of displacer reciprocation within that pump to 144 rpm. Eventually, when the temperature of the second stage of a pump drops to 40 K, the algorithm further slows the rate of displacer reciprocation within that pump to 72 rpm.

Figure 6:
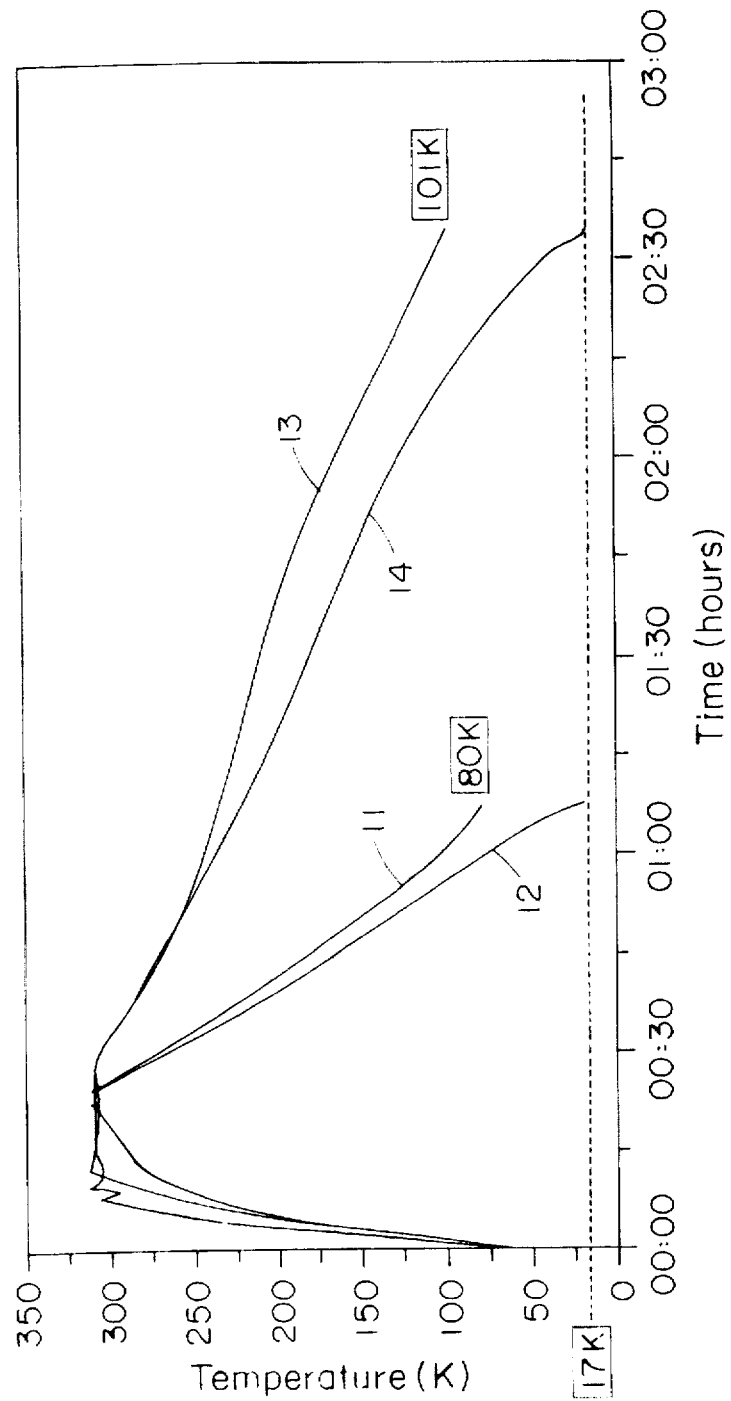
FIG. 6 is a thermal profile of the first and second stages of a cryopump comparing a regeneration performed using speed profiling with a regeneration performed using a fixed operating displacer speed.

FIG. 6 illustrates the thermal profile of the first stage 11 and of the second stage 12 of a cryopump over the course of a regeneration procedure in which the above-described profile of displacer speed was employed. For comparison, the graph also illustrates the thermal profile of the first 13 and second 14 stages of a cryopump over the course of a regeneration procedure using a standard, constant displacer speed of 72 RPM. As shown, the rapid cooling achieved by profiling the displacer speed, as described, reduced the time required to perform the regeneration by more than half.

The rate of cooling within a cryopump increases linearly as the rate of displacer reciprocation within that cryopump increases. Conversely, cooling within each pump will slow as the rate of displacer reciprocation drops. Because this embodiment of the method allows warmer pumps to reciprocate at a faster rate than colder pumps, the embodiment accelerates cooling at warmer temperatures and thereby shortens the time required to cool the warmer pumps as compared to using a fixed reciprocation rate. As before, proportional control of the displacer drive may be used.

Use of the displacer speed profile likewise reduces the cooldown time of a plurality of cryopumps supplied by a common compressor by maximizing the capacity of each cryopump to process compressed gas at warm temperatures, where compressed gas supply is usually plentiful yet where cooling rates are typically slowest. By accelerating warm-temperature cooling rates, use of the displacer speed profile reduces the likelihood that a warm cryopump will be detained at warm temperatures while colder pumps starve it of its compressed gas supply.

We claim:

1. A method for regulating cooldown of a plurality of cryogenic refrigerators supplied with compressed refrigerant from a common compressor comprising the steps of:
   monitoring the cooldown of the plurality of cryogenic refrigerators;
   governing the cooldown of at least one cryogenic refrigerator in response to the monitoring of cooldown to redistribute gas flow from the compressor to the cryogenic refrigerators for accelerated cooldown of an individual cryogenic refrigerator.

2. The method of claim 1, wherein the governing of the cooldown of at least one cryogenic refrigerator reduces the temperature differential among the cryogenic refrigerators.

3. The method of claim 1, wherein the governing of the cooldown of at least one cryogenic refrigerator limits the mass flow of refrigerant from the common compressor to a cryogenic refrigerator that is cooler than at least one other cryogenic refrigerator.

4. The method of claim 3, wherein the monitoring of the cooldown of a plurality of cryogenic refrigerators includes the step of measuring the temperature of the plurality of cryogenic refrigerators, and the limiting of the mass flow of cryogenic refrigerant commences when the detected temperature of the cooler cryogenic refrigerator is less than a preselected triggering limit.

5. The method of claim 4, wherein the governing of cooldown includes supplying heat to the cooler cryogenic refrigerator.

6. The method of claim 4, wherein at least one cryogenic refrigerator utilizes a displacer in a Gifford-McMahon refrigeration process.

7. The method of claim 6, wherein the governing of cryogenic refrigerator temperature includes adjusting the speed of at least one displacer.

8. The method of claim 7, wherein the governed cryogenic refrigerator has a temperature below the triggering limit, and the adjusting of the speed of at least one displacer includes slowing the speed of the displacer in the governed cryogenic refrigerator.

9. The method of claim 7, wherein the displacer in the governed cryogenic refrigerator is maintained at an approximately constant pumping speed when the refrigerator is cooled to its operating temperature, the method further comprising the step of operating the displacer in the governed cryogenic refrigerator, when the temperature of the governed cryogenic refrigerator is above the triggering limit, at a speed at least twice as fast as the pumping speed.

10. The method of claim 9, wherein the governed cryogenic refrigerator includes a first stage and a second stage, each stage including a displacer, the displacers in the governed cryogenic refrigerator being slowed to a first reduced speed after the temperature of the first stage drops below a first triggering limit, and the displacers in the governed cryogenic refrigerator being slowed to a second reduced speed after the temperature of the second stage drops below a second triggering limit, the displacers then being maintained approximately at the second reduced speed when the governed cryogenic refrigerator is at its cold, operating temperature.

11. The method of claim 6, wherein the governing of cryogenic refrigerator temperature includes halting the operation of the cooler cryogenic refrigerator until the temperature of the cooler cryogenic refrigerator rises above a reactivation value.

12. The method of claim 4, wherein the triggering limit is a fixed temperature.

13. A system comprising:
   a plurality of cryogenic refrigerators;
   a compressor pneumatically coupled with each of the cryogenic refrigerators
   a network terminal programmed to monitor cooldown of at least one cryogenic refrigerator and, in response to the monitoring of cooldown, to govern the cooldown of at least one cryogenic refrigerator to redistribute gas flow from the compressor to the cryogenic refrigerators for accelerated cooldown of an individual cryogenic refrigerator.

14. The system of claim 13, wherein the cryogenic refrigerators are components of cryopumps.

15. The system of claim 13, wherein the network terminal is programmed to govern the cooldown of at least one cryogenic refrigerator by supplying heat.

16. The system of claim 13, wherein at least one of the cryogenic refrigerators includes a displacer that can linearly reciprocate to perform a Gifford-McMahon cooling cycle, and wherein the network terminal is programmed to govern the cooldown of at least one cryogenic refrigerator by adjusting the speed at which the displacer reciprocates.

17. The system of claim 16, wherein the network terminal is programmed to govern the cooldown of at least one cryogenic refrigerator by halting the processing of compressed refrigerant by the governed cryogenic refrigerator until the governed cryogenic refrigerator warms to a temperature above a reactivation value.

18. A network terminal for governing the cooldown of at least one cryogenic refrigerator in a plurality of cryogenic refrigerators supplied by a common source of compressed gas, the network terminal comprising:
   a means of communication for communicating with the plurality of cryogenic refrigerators; and
   a processor programmed to monitor the temperature of the plurality of cryogenic refrigerators and, in response to the monitoring of temperature, to govern the cooldown of a cryogenic refrigerator having a temperature below a triggering limit to redistribute compressed gas from the common source of compressed gas to shorten the time needed for the plurality of cryogenic refrigerators to complete cooldown.

19. The network terminal of claim 18, wherein the cryogenic refrigerators are components of cryopumps.

20. The network terminal of claim 18, wherein the processor is programmed to govern the cooldown of at least one cryogenic refrigerator by supplying heat.

21. The network terminal of claim 18, wherein at least one of the cryogenic refrigerators includes a displacer that can linearly reciprocate to perform a Gifford-McMahon cooling cycle, and wherein the processor is programmed to govern the cooldown of at least one cryogenic refrigerator by adjusting the speed at which the displacer reciprocates.

22. The network terminal of claim 21, wherein the processor is programmed to govern the cooldown of at least one cryogenic refrigerator by halting the displacer.

* * * * *